United States Patent
Engdahl

(10) Patent No.: US 6,269,414 B1
(45) Date of Patent: Jul. 31, 2001

(54) DATA RATE DOUBLER FOR ELECTRICAL BACKPLANE

(75) Inventor: Jonathan R. Engdahl, Chardon, OH (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/115,121

(22) Filed: Jul. 14, 1998

(51) Int. Cl.⁷ .............................. G06F 13/14; G06F 1/04
(52) U.S. Cl. ........................... 710/101; 710/60; 713/600
(58) Field of Search ................................ 710/101, 100, 710/60; 713/600

(56) References Cited

U.S. PATENT DOCUMENTS

| | | | | |
|---|---|---|---|---|
| 5,331,641 | * | 7/1994 | Parruck et al. | 370/506 |
| 5,784,390 | * | 7/1998 | Masiewicz et al. | 714/763 |
| 5,829,026 | | 10/1998 | Leung et al. | 711/122 |
| 5,949,436 | * | 9/1999 | Horan et al. | 345/501 |
| 5,964,856 | * | 10/1999 | Wu et al. | 710/110 |
| 5,987,619 | | 11/1999 | Hamamoto et al. | 713/401 |
| 6,005,412 | | 12/1999 | Ranjan et al. | 326/63 |
| 6,067,589 | * | 5/2000 | Mamata | 710/63 |
| 6,078,546 | | 6/2000 | Lee | 365/233 |
| 6,078,805 | | 7/2000 | Pawlowski | 365/194 |
| 6,097,640 | | 8/2000 | Fei et al. | 365/189.02 |
| 6,104,225 | | 8/2000 | Taguchi et al. | 327/298 |

OTHER PUBLICATIONS

Accelerated Graphics Port Interface Specification Revision 1.0 Intel Corporation Jul. 31, 1996.

* cited by examiner

*Primary Examiner*—Paul R. Myers
(74) *Attorney, Agent, or Firm*—Adam J. Forman; Alexander M. Gerasimow; William R. Walbrun

(57) ABSTRACT

High data rate I/O modules may be placed on a synchronous bus used also with legacy low data rate I/O modules without rendering the latter modules incompatible and without changing the clock rate of the bus by interleaving extended data to be read at falling edges of the clock with conventional data for the legacy modules to be read at rising edges of the clock. High data rate modules read both extended and conventional data effectively doubling the data transmission rate.

8 Claims, 3 Drawing Sheets

DATA RATE DOUBLER FOR ELECTRICAL BACKPLANE

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers for the real-time control of industrial processes, and in particular, to an industrial controller having modular components including modular input and output circuits. Industrial controllers are special purpose computers used for controlling industrial processes for manufacturing equipment. Under the direction of a stored program, the industrial controller examines a series of inputs reflecting the status of a controlled process or controlled equipment, and changes outputs effecting control of the process or equipment. In the simplest case, the inputs and outputs are binary, i.e., "ON" or "OFF"; however, analog inputs and outputs taking on a continuous range of values and multiword digital values are also used. The signals received by the industrial controller from the controlled process, and transmitted from the industrial controller to the controlled process, are normally passed through one or more input/output (I/O) modules which serve as electrical interfaces between the controller and the process. In a typical industrial controller, a central computer-like processor communicates with a number of these separate I/O modules, some of which may be spatially remote from the processor and connected to the processor by means of a communication network attached to an adapter which communicates with the I/O modules.

By dividing the function of the industrial controller among the central processor and a number of separate I/O modules, I/O data may be efficiently collected and disseminated at spatially separated points in the controlled process. The use of separate I/O modules also permits the industrial controller to be flexibly configured to meet a given control task without the need to purchase and configure unnecessary I/O modules. Modularity is provided by connecting the various modules to a common backplane which serves to conduct data between the modules. Then additional points of interface between the controller and processor are needed, new I/O modules may be connected to the backplane.

The backplane may transfer data over a number of parallel data conductors as synchronized to a clock signal also on the backplane. Data is placed on the backplane as triggered by a first edge of the clock signal, and after a period of stabilization, read from the backplane on a second edge of the clock signal. The frequency of the clock signal will normally be adjusted to provide greatest data transfer rate commensurate with the limitations in the hardware in writing and reading the data. In such synchronous systems, at any given time, one modular device will have control of the backplane for transmitting data to prevent transmission conflicts.

As new I/O modules are developed having extended functions, pre-existing backplanes may have insufficient capacity to communicate the necessary data at the desired rate. While modification of the backplane to accommodate faster data transmission is possible, for example, by increasing the clock frequency, such modification risks losing compatibility with pre-existing "legacy" modules. Failure to maintain such compatibility makes using a new "extended function" module unattractive to the extent that it may require the customer to replace all legacy hardware. Additional costs may be incurred if rewiring I/O lines to modules replacing the legacy modules, and changing the control program to accommodate the replacement modules is required.

BRIEF SUMMARY OF THE INVENTION

The present invention provides a method of obtaining increased performance from an industrial controller backplane, allowing the backplane to support a higher data transfer rate needed for new modules, while preserving the backplane's compatibility with slower, legacy I/O modules.

Generally, the invention partitions data transmission into first and second periods, the first period being centered around the rising edge of the clock signal as is normally recognized by legacy hardware, and second period being centered around the falling edge of the clock signal. Extended function modules receive data in both the first and second periods, legacy modules receive data only in the first period, as was always the case. In this way, extended function modules may receive data at twice the data rate without affecting the clock rate of the backplane nor the ability of legacy modules to receive data and thus to be compatible with the same backplane. A specific flag bit in the header of messages transmitted on the backplane may distinguish between conventional and extended data, eliminating any ambiguity by the modules.

Specifically, the present invention provides a method of increasing the data capacity of an electrical backplane while maintaining compatibility with legacy modules connected to the electrical backplane, the electrical backplane having a plurality of parallel data lines and a clock line providing a clock signal with a logical rising edge and a logical falling edge, the legacy modules reading data from the backplane at the logical rising edge. The method includes the steps of outputting first data to the data lines at a time between successive logical falling and rising edges, and holding the data on the data lines during a latter logical rising edge for reading by both legacy and extended modules. The method further outputs second data to the data lines at a time between successive logical rising and falling edges, and holds that data on the data lines during a latter logical falling edge for reading by extended modules only.

Thus, it is one object of the invention to allow both high and low data rate modules to be connected to the same electrical backplane originally designed for low data rate modules.

The second data may be transmitted as part of a message of first and second data, the message preceded with a data header identifying it as including second data. Thus, it is another object of the invention to allow dual data rate transmission on a backplane while avoiding possible ambiguity to the receiving modules.

The step of outputting first and second data to the data lines at a time between logical falling and rising edges may involve the step of producing a secondary synchronous clock signal, not transmitted on the backplane, and having twice the frequency of the clock signal, and outputting data at the logical rising edges of the second clock signal.

Thus, it is another object of the invention to allow the high data rate transfer described above while maintaining the reliability and predictability of a synchronous system.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
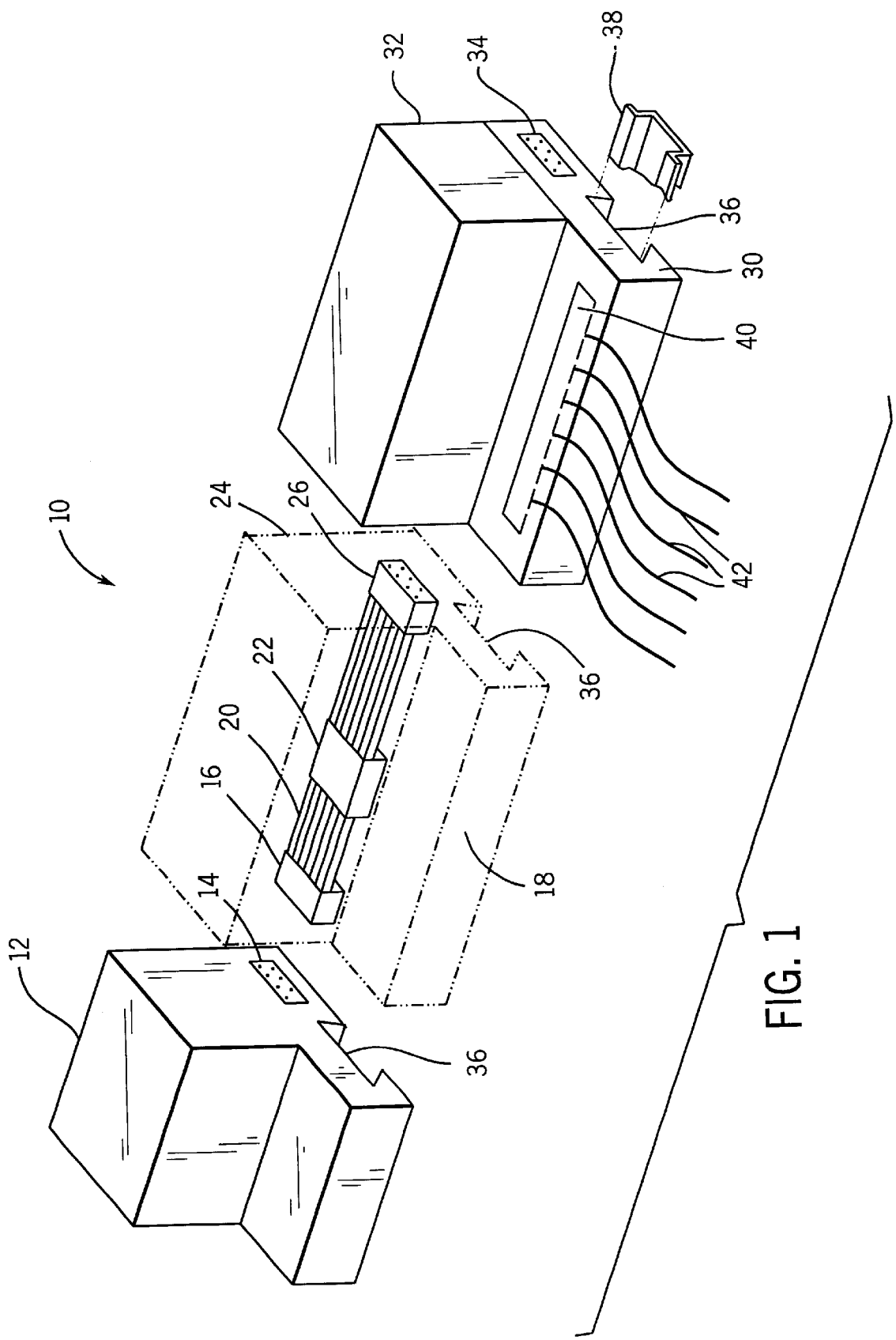
FIG. 1 is a simplified perspective view of an industrial controller having a modular architecture with modules attached to an extensible electrical backplane.

Referring now to FIG. 1, an industrial controller 10 includes an adapter 12 receiving I/O data from and transmitting I/O data to a remote processor (not shown). Alternatively, adapter 12 may include a processor executing a control program in accordance with received I/O data to generate I/O data for relay to a controlled process.

A first connector 14 extends from the side of the adapter 12 to receive a corresponding second connector 16 on a terminal base 18. Second connector 16 connects in turn to an electrical backplane 20 inside the terminal base 18, having on it, an internal connector 22. Internal connector 22 allows a legacy module 24 to be connected to the electrical backplane 20.

A third connector 26 is attached to the electrical backplane 20 across the terminal base 18 from connector 16 and yet a second terminal base 30 to be attached to the terminal base 18 continuing the electrical backplane 20.

The portion of the electrical backplane 20 within the second terminal base 30 holds a second internal connector (not shown) similar to internal connector 22 allowing the connection of a second extended function module 32. The second terminal base 30 also has a fourth connector 34, similar to connector 26, to allow the electrical backplane to be yet further extended.

The adapter 12 and the terminal bases 18 and 30 include slots 36 on their undersurface that may be received by a standard DIN rail 38 to allow them to be physically as well as electrically connected together. It will be understood to one of ordinary skill in the art, that the use of the terminal bases with opposed connectors, allows the electrical backplane 20 to be arbitrarily extended to accommodate a number of different modules depending on the needs of the industrial controller.

Terminal bases 18 and 30 include terminal strips 40 providing a connection point for electrical leads 42 to the controlled process for the communication of I/O signals between the modules 24 and 32 for those terminal bases 18 and 30 and the controlled process.

Figure 2:
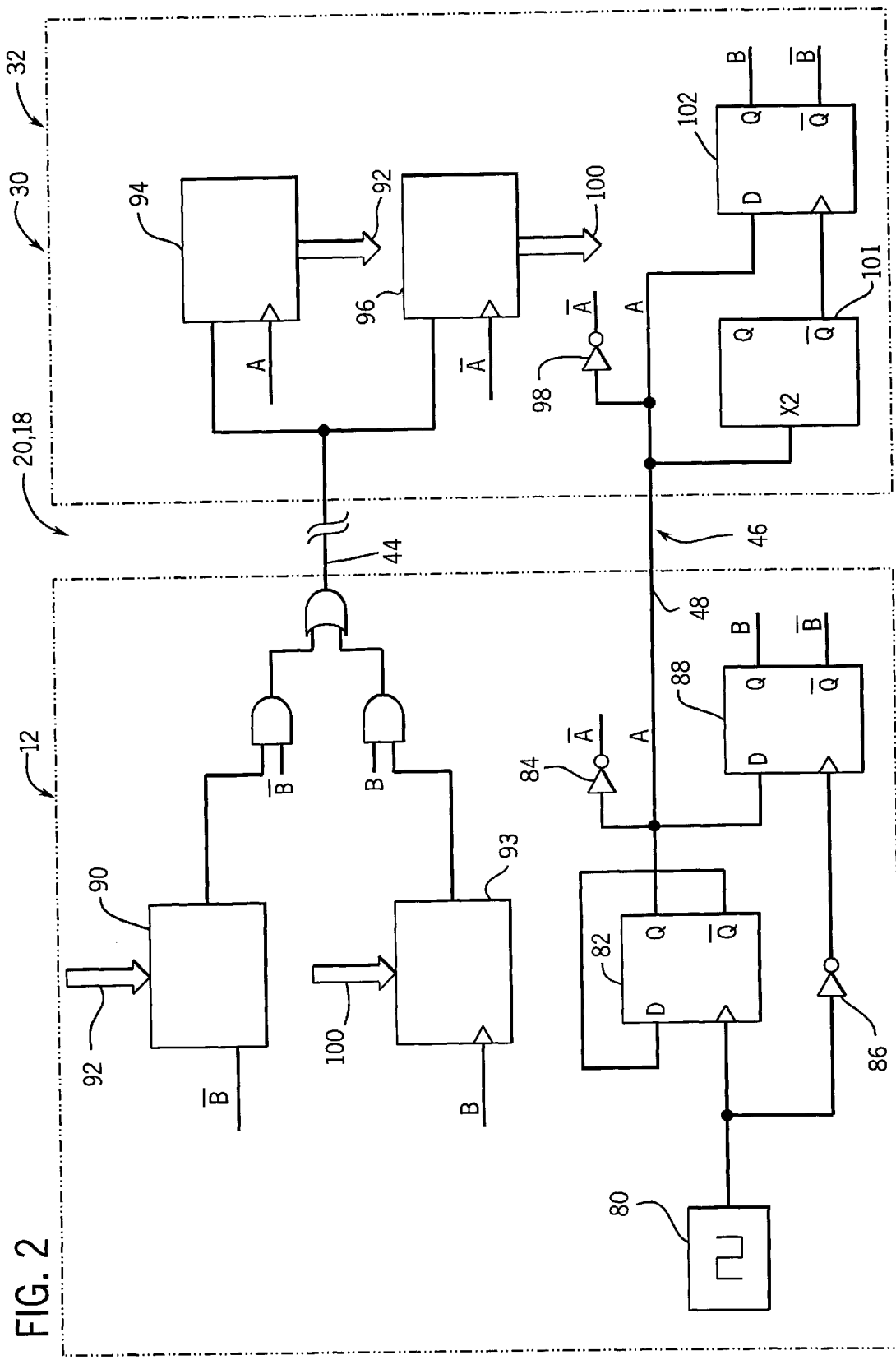
FIG. 2 is a simplified schematic of a transmitting and receiving circuit constructed according to the present invention for communication on the electrical backplane of FIG. 1.
Figure 3:
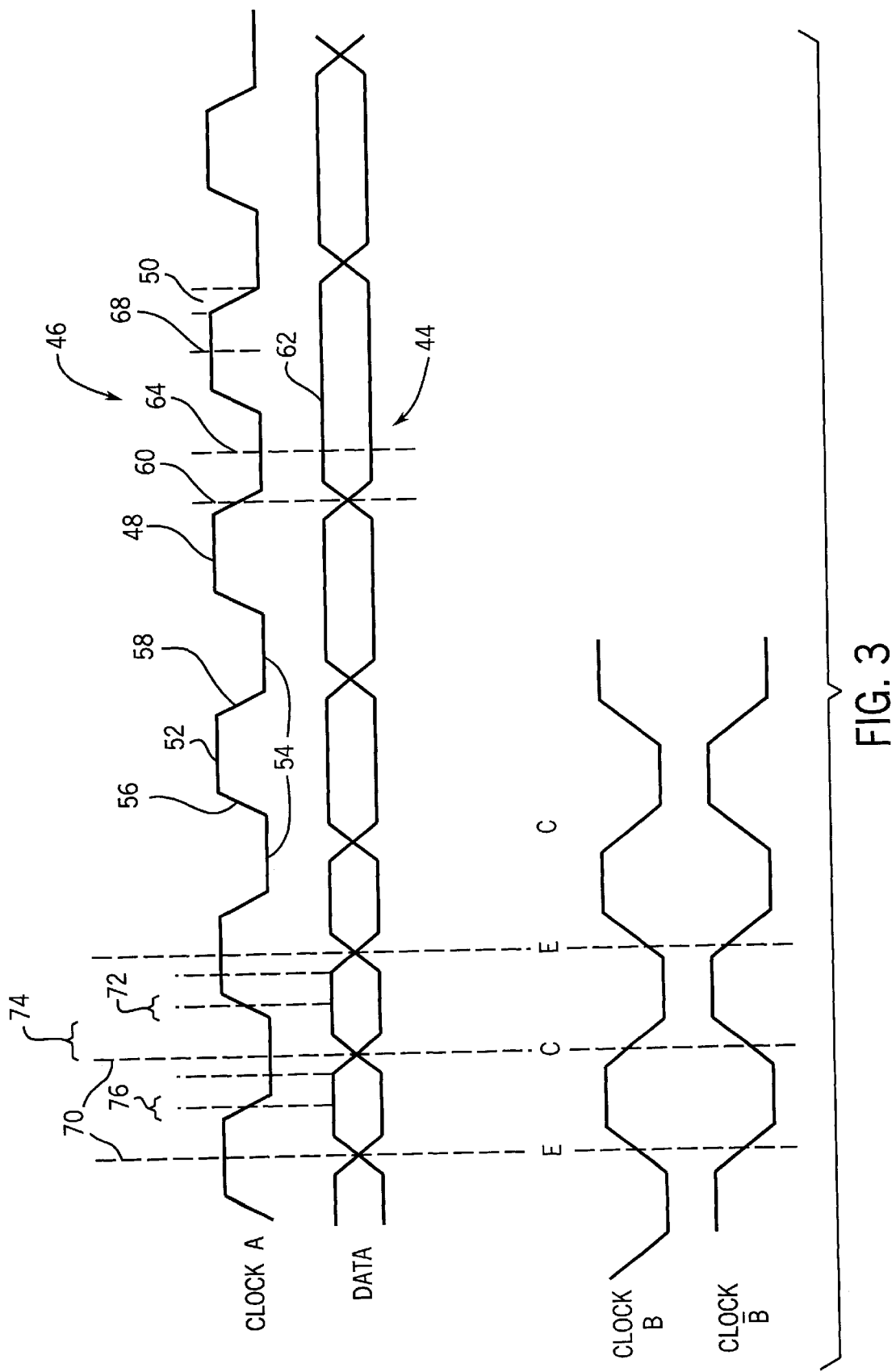
FIG. 3 is a timing diagram indicating the timing of signals sent by the circuit of FIG. 2 on the electrical backplane.

Referring now to FIG. 2, the electrical backplane 20 includes a number of parallel data conductors 44 and a clock line 46. Referring momentarily to FIG. 3, the clock line 46 produces a clock signal 48 being a square wave having finite transition times 50 between a logical high state 52 and a logical low state 54. The term "logical" is used herein to distinguish the states of the clock signal 48 from actual voltage levels, it being recognized to those of ordinary skill in the art that the designation of logical high or logical low is arbitrary. Thus, a logical rising edge 56 occurs between logical low state 54 and logical high state 52, but is not necessarily a rising voltage. Equally, a logical falling edge 58 occurring between a logical high state 52 and logical low state 54 need not be a falling voltage level.

Pre-existing legacy modules 24 receive data 62 that is placed on data conductors 44 at a logical falling edge 58 indicated at time 60. The data 62 must stabilize no later than time 64 after the preceding logical falling edge 58, which typically precedes the next logical rising edge 56 by a fraction of the period of the clock signal 48. This time interval between the time 64 and the rising edge 56 will be termed the set-up time. Data 62 must further remain stable until at least time 68, which typically follows rising edge 56 by a fraction of the period of the clock signal 48. This time interval between rising edge 56 and time 68 will be termed the hold time. The lengths of the setup and the hold times are determined by the hardware driving and reading the electrical back plane 20 and its electrical characteristics.

Modules 24 and 32 must acquire the data on the parallel data conductors between times 64 and 68.

The period of the clock signal 48 may never be less than the sum of the setup time and the hold fall time without the introduction of errors in the data transmission. With given hardware, the clock 48 may not simply be increased to increase the data rate.

In the present invention, higher data rates may be obtained using the same clock signal 48, but outputting data not on the falling edge of the clock signal 48 as has been described, but at a midpoint 70 between rising and falling edges of the clock signal 48. Generally, compatible data, i.e., data compatible with legacy modules 24, is written to the parallel data conductors 44 at a midpoint 70 following a logical falling edge 76 of the clock signal 48 to be acquired by the extended function module 32 at a logical rising edge 72 of the clock signal 48. This data may be read by legacy modules 24 as it occurs within the same setup and hold period of data acquisition normally used by those legacy modules. Driving circuitry with lower impedance or other adjustments, however, may be necessary to stabilize the data more quickly on the parallel data conductors 44, reducing the set-up time to at most the interval 74 between the midpoint 70 preceding the acquisition and the start of the rising edge of the clock signal 48. The viability of this invention is predicated on the assumption that the data rate is not primarily constrained by setup and hold times, but by other factors.

In addition to the conventional data transmitted to the legacy module 24, extended data may be transmitted to the extended function module 32. Extended data is written to the parallel data conductors 44 at a midpoint 70 between logical rising edges 72 and logical falling edges 76, of the clock signal 48 to be read during the next succeeding logical falling edge 76 of clock signal 48, an interval normally reserved for setting up data for logical rising edge 72.

Thus, for extended function modules, during each period of the clock signal 48, extended data may be transmitted to be received at the falling edge of clock signal 48, and conventional data may be transmitted to be received at the rising edge of clock signal 48. Here the data 62 must be changed on the parallel data conductors 44 more quickly, but this may be accomplished with higher-powered driving circuitry or even with the same-powered driving circuitry if additional margin was built into the clock signal 48 as has been described.

Referring now to FIGS. 2 and 3, the circuitry necessary for transmitting and receiving extended data may be incorporated into the adapter 12 and extended function module 32. At the adapter 12 (shown in FIG. 3), the clock signal 48 on clock line 46 may be produced by an oscillator 80 operating at twice the frequency of clock 48 feeding a clock input of a D-type flip-flop 82 configured in toggling mode to provide at its Q output, the clock signal 48 of half the frequency designated as A. Alternatively, it will be understood, as will be described below, that the adapter 12 may receive the clock signal 48 generated as described but by an external circuit.

The clock signal A may be fed to an inverter 84 to produce the signal $\overline{A}$ which will be used for the receipt of data by the adapter 12 as will be understood from the following discussion.

The clock from oscillator 80 may also pass to a second inverter 86 feeding the clock input of a second D-type flip-flop 88 whose D input is attached to the clock line 48 to receive signal A. The result is that the inverting and noninverting outputs of the D flip-flop 88 produce signals $\overline{B}$ and B, respectively (shown in FIG. 3) of identical frequency to that of clock signal A but with a 90° phase shift with respect to clock signal A.

Conventional data 92 may be fed to a parallel serial converter 90, such as a parallel load shift register, and clocked by the $\overline{B}$ signal produced by flip-flop 88. Extended data 100 may be received by a similar shift register 92 but clocked by signal B so as to provide clocking of shift registers 90 and 92 at alternate times 70 shown in FIG. 3.

The outputs from the shift registers 90 and 92 may be provided to a steering network controlled by the B and $\overline{B}$ signal so that only one of the outputs of the devices 90 and 92 is attached to data line 44 at the time of its clocking. In this way extended and conventional data is transmitted in an alternating fashion.

The data conductor 44 passing to the extended function module 32 may branch to be received by serial to parallel converters 94 and 96, each being a shift register providing for parallel unloading of extended data 92 and conventional data 100. These shift registers 94 and 96 are clocked by the A and $\overline{A}$ not signal, respectively, so as to provide for a sampling during the logical rising edge 72 and falling edge 76 of clock signal A slightly after the data has been placed on the data conductor 44 by the shift registers 90 and 92, respectively.

The necessary clock signals A and $\overline{A}$ are obtained simply from the clock line 48 directly (for A) or passing through an inverter 98 (for $\overline{A}$). B and $\overline{B}$ signals used for when the extended function module 32 is transmitting data may be generated through the use of a clock multiplier 100 fed by the clock line 98 and providing a clocking to a D flip-flop 102 whose D input connects to the A clock signal, clock 48.

Thus, it will be understood that interleaved data may be transmitted on the electrical backplane 20, effectively doubling the data transmission rate for certain extended function modules 32, whereas conventional data may be sent at the lower data rates using the same circuitry. When extended data is sent, the legacy modules simply ignore the extended data 100 which is being placed on the electrical backplane 20 at a time when the legacy modules 24 are not sampling data. This structure also prevents the legacy module 24 from inadvertently receiving extended data 100. Conventional data is sent to extended function modules 32 with the simple expedient of beginning each multiple data packet message during the conventional data period, with a header indicating whether the message will use only conventional data or conventional and extended data. The extended modules 32 may therefore be programmed in certain situations to receive only conventional data, ignoring intervening extended data or the absence thereof.

It will be understood that this technique may be extended to allow multiple transmissions of extended data for each clock period of clock signal 48, provided the set-up and hold times of the circuitry so allow, through the use of multiplier 80 with a greater multiplication factor on the clock signal 48 and a modification of the Boolean logic circuitry 84, as will be understood to those of ordinary skill in the art from the foregoing description.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A method of increasing the data capacity of an electrical backplane while maintaining compatibility with legacy modules and high data rate modules that are simultaneously connected to the electrical backplane, the electrical backplane having a clock line providing a conventional clock signal with a logical rising edge and a logical falling edge, the method comprising the steps of:

a) providing on the electrical backplane a plurality of parallel data lines connected to a corresponding plurality of slots configured to accept legacy and high data rate modules;

b) outputting first data to the data lines at a time between successive logical falling and rising edges and holding that data on the data lines during the latter logical rising edge, a first portion of the first data being read by select ones of the legacy modules, and a second portion of the first data being read by select ones of the high data rate modules; and c) outputting second data to select ones of the high data rate modules along the data lines at a time between successive logical rising and falling edges and holding that data on the data lines during the latter falling edge.

2. The method of claim 1 wherein the second data is transmitted as part of a message of first and second data, the message preceded with a data header identifying it as including second data.

3. The method of claim 1 wherein the first data is held at the rising edge for the sum of a set up and hold period of time required by the legacy modules and wherein the clock signal has a period substantially equal to the sum of the set up and hold period.

4. The method of claim 1 wherein the step of outputting first and second data to the data lines at a time between logical falling and rising edges involves the step of producing a synchronous second clock signal having twice the frequency of the clock signal and outputting data at logical rising edges of the second clock signal.

5. An industrial control system comprising:

an electrical back plane having a plurality of parallel data conductors and a conventional clock line having a clock signal with a first frequency presenting periodic logical rising edges and logical falling edges;

legacy modules that may be removably connected to the electrical backplane, the legacy modules reading first data from the data conductors on a logical rising edge of the clock signal; and high data rate modules that may be removable connected to the data conductors while legacy modules are simultaneously connected to the backplane, the high data rate modules reading compatible data from the data conductors on a logical rising edge of the clock signal and on a logical falling edge of the clock signal.

6. The industrial control system of claim 5 including an adapter removably connected to the data conductors to transmit data on the data conductors by outputting first data to the data lines at a time between successive logical falling and rising edges and holding that data on the data lines during the latter logical rising edge for reading by legacy modules and the high data rate modules and outputting second data to the data lines at a time between successive logical rising and falling edges and holding that data on the data lines during the latter logical falling edge for reading by the high data rate modules.

7. The industrial control system of claim 6 wherein the adapter includes a clock multiplier generating a synchronous second clock signal having a second frequency twice the first frequency of the clock signal whereby the transmitter may output data at logical rising edges of the second clock signal.

8. The industrial control system of claim 6 wherein the adapter is an high data rate module.

* * * * *